United States Patent
Bösl (10) Patent No.: US 12,103,464 B2
(45) Date of Patent: Oct. 1, 2024

(54) EQUIPMENT COMPONENT FOR A VEHICLE

(71) Applicant: GRAMMER AG, Ursensollen (DE)

(72) Inventor: Manuel Bösl, Freudenberg (DE)

(73) Assignee: GRAMMER AG, Ursensollen (DE)

( * ) Notice: Subject to any disclaimer, the term of this patent is extended or adjusted under 35 U.S.C. 154(b) by 13 days.

(21) Appl. No.: 18/084,876

(22) Filed: Dec. 20, 2022

(65) Prior Publication Data
US 2023/0211737 A1 Jul. 6, 2023

(30) Foreign Application Priority Data
Dec. 21, 2021 (DE) .................. 10 2021 134 096.9

(51) Int. Cl.
*F16M 11/00* (2006.01)
*B60N 2/879* (2018.01)
*B60N 2/885* (2018.01)
*B60R 11/00* (2006.01)
*F16H 19/04* (2006.01)
(Continued)

(52) U.S. Cl.
CPC .............. *B60R 11/00* (2013.01); *B60N 2/879* (2018.02); *B60N 2/885* (2018.02); *F16H 19/04* (2013.01); *B60N 2/753* (2018.02); *B60N 2/773* (2018.02); *B60R 2011/0017* (2013.01); *B60R 11/0217* (2013.01); *B60R 11/0247* (2013.01)

(58) Field of Classification Search
CPC . B60R 11/00; B60R 11/0217; B60R 11/0247; B60R 2011/0017; B60N 2/879; B60N 2/885; B60N 2/753; B60N 2/773; B60N 2/02253; F16H 19/04
See application file for complete search history.

(56) References Cited

U.S. PATENT DOCUMENTS

| 11,686,430 | B2* | 6/2023 | Wang ..................... | H04M 1/04 248/467 |
| 2008/0073946 | A1* | 3/2008 | Maione ................. | A47C 7/705 297/161 |
| 2020/0369188 | A1 | 11/2020 | Samain | |

(Continued)

FOREIGN PATENT DOCUMENTS

| DE | 102013018900 A1 | 5/2015 |
| EP | 3031665 A1 | 6/2016 |

OTHER PUBLICATIONS

Excerpt of German examination report dated Aug. 9, 2022 in Application DE 102021134096.9, 1 page.

*Primary Examiner* — Amy J. Sterling
(74) *Attorney, Agent, or Firm* — LUCAS & MERCANTI, LLP; Klaus P. Stoffel (57) ABSTRACT

An equipment part with a base and at least one pivot device, which is pivotable about a pivot axis relative to the base, with a drive device with which the pivot device is pivotable between a first position and a second position. The pivot device includes a base part and an extension part, wherein the extension part is guided movably relative to the base part in a translatory manner between a primary position and a secondary position. Associated with the base is a first support surface that engages with a second support surface, which is associated with the extension part, and rolls on this during the pivoting movement between the first position and the second position, wherein the extension part moves between the primary and the secondary position.

11 Claims, 9 Drawing Sheets

(51) Int. Cl.
*B60N 2/75* (2018.01)
*B60R 11/02* (2006.01)

(56) References Cited

U.S. PATENT DOCUMENTS

2023/0406509 A1* 12/2023 Salcedo ............. B64D 11/0646
2024/0051447 A1* 2/2024 Mossington ........... H04R 5/023

* cited by examiner

EQUIPMENT COMPONENT FOR A VEHICLE

CROSS-REFERENCE TO RELATED APPLICATIONS

The present application claims priority of DE 10 2021 134 096.9, filed Dec. 21, 2021, the priority of this application is hereby claimed and this application is incorporated herein by reference.

BACKGROUND OF THE INVENTION

The invention relates to an equipment part for a vehicle with at least one pivot device comprising a pivotable arm with a base part and a part that can be moved relative to the base part in a translatory manner.

An equipment part in the form of a headrest is known from the prior art. On both side regions of a basic body the headrest has arms that are pivotable between a non-use position and a use position. Each arm comprises a base part and an extension part. The base part was driven pivotably by means of a drive. The extension part could be moved by means of a separate drive between a base position and an extended position.

SUMMARY OF THE INVENTION

The object of the invention was to create an equipment part that causes a smaller manufacturing outlay and a smaller control outlay.

The equipment part comprises a base and at least one pivot device with an arm pivotable relative to the base about a pivot axis between a first position and a second position. E.g. two pivot devices are formed on the base. The arms of both pivot devices can move e.g. synchronously. Alternatively, the arms of both pivot devices could also not move synchronously to one another.

According to another embodiment, only one pivot device is mounted on the base. An arm of the pivot device is pivotable between the first position and the second position by a drive device.

The pivot device comprises an arm with a base part and an extension part. The extension part is movable relative to the base part in a translatory manner between a primary position and a secondary position. In the primary position, the base part and the extension part are located in a nested position. In the secondary position, the base part and the extension part are located in an elongated position. This means that the arm formed by the base part and the extension part has a shorter length in the primary position than in the secondary position.

The drive also moves the extension part between the primary position and the secondary position. The drive is thus provided both for the pivoting movement of the arm and for the translatory movement of the extension part relative to the base part.

The extension part is guided on the base part by means of a guide device. The extension part is guided movably on the base part between the primary position and the secondary position by means of the guide device.

Associated with the base is a first support surface, which engages with a second support surface associated with the extension part. The first support surface is formed circular. It is formed e.g. on a circular cylindrical element. During the pivoting movement between the first position and the second position, the second support surface rolls on the first support surface, wherein the extension part moves between the primary and the secondary position.

The advantage of the invention consists among other things therein that only one drive is present for the pivoting movement of the base part between the first position and the second position and for the extending movement of the extension part between the primary position and the secondary position. The manufacture and control of the equipment part is thus less costly with regard to the parts outlay and the control outlay. The desired function, comprising pivoting movement and translatory movement, is nevertheless guaranteed with the solution according to the invention.

The second support surface is e.g. fixedly connected to the extension part. It can be connected directly or indirectly to the extension part. In this embodiment, the first support surface can be connected e.g. by means of customary attachment methods to the base. Alternatively, the first support surface is e.g. molded on the base part. The first support surface does not move relative to the base, for example. During the pivoting movement, a relative movement takes place in this embodiment between the first support surface and the second support surface in the manner that the second support surface is moved around the first support surface, whereby the arm formed by the base part and the extension part is guided around the first support surface. Simple manufacture is possible with this embodiment of the second support surface.

According to an alternative implementation, e.g. the first support surface is movable relative to the base. The base part is also movable relative to the base. In this case the first support surface rotates such that the movement of the extension part relative to the base part is supported. In a particular pivoting movement of the base part, the extension part in this embodiment can execute a greater relative movement relative to the base part than if the first support surface is immovable relative to the base.

For example, the first support surface is formed by a ring gear or a gearwheel and the second support surface is formed by a toothed rail. A ring gear is e.g. fixedly connected to the base. Alternatively, e.g. a gearwheel is movable relative to the base. The is gearwheel is e.g. driven by the same drive as the pivot part. In this embodiment no slip occurs between the first support surface and the second support surface, because the teeth mesh in a positive-locking manner.

According to an alternative implementation, the first support surface is formed by a friction wheel and the second support surface by a friction track. In this embodiment also, the friction wheel can be fixedly connected to the base and thus immovable relative to the base, or alternatively rotatable relative to the base. Silent running can be guaranteed with this implementation when the support surfaces roll on one another.

To guarantee the guidance of the extension part on the base part, the equipment part has a guide device with first guide means associated with the base part, which means engage with second guide means of the extension part. A guide of this kind is formed e.g. by a dovetail guide, wherein lateral regions of one guide means are arranged in grooves of the other guide means such that only one degree of freedom exists in two opposed movement directions. The extension part can then not become unintentionally detached from the base part.

The second support surface is e.g. arranged between a guide surface of the second guide means and the first support surface such that on movement of the pivot part between the first position and the second position, the second support surface is always in engagement with the first support surface. For example, if the first support surface and the second support surface are designed in the form of teeth, e.g. a play can be present between the support surfaces. If e.g. the support surfaces are designed as friction surfaces, e.g. a press fit is to be provided.

The drive device comprises e.g. at least one motor, e.g. an electric motor. Alternatively all suitable drives can be considered. In addition, the drive can comprise e.g. a transmission, in order to provide any required transmission ratio of the speeds between a drive shaft of the motor and the base part or between the drive shaft and the first support surface.

The equipment part is e.g. a headrest and the pivot device is an arm pivotable relative to the base. The arm is supported e.g. on at least one side region, in particular on two opposing side regions of a head box, which forms the base. The base part and/or the extension part can serve e.g. as carriers for at least one loudspeaker and/or at least one microphone and/or other electronic units. Alternatively or in addition, the arm can serve e.g. in the second position also as a rest for the head of the seat occupant. In a non-use position, e.g. the base part is arranged in the first position and the extension part approximately vertically in the primary position. In a use position, the base part is pivoted with regard to the first position by approx. 90° forwards into the second position. The term "forwards" refers here to the sagittal plane of a seat occupant sitting in a vehicle seat provided with the headrest.

According to one embodiment, the equipment part is an arm and the pivot device is an armrest pivotable relative to the base. The armrest is arranged e.g. approximately vertically in the first position, wherein the term "vertical" in the sense of the invention includes deviations of up to 20° from vertical. In the pivoting movement of the armrest from the first position to the second position, the extension part of the armrest moves from the primary position to the secondary position, wherein the length of the armrest increases with regard to the primary position.

Exemplary embodiments of the invention are described by way of example in the following description of the figures, also with reference to the drawings. For the sake of clarity here—even if different exemplary embodiments are concerned—identical or comparable parts or elements or regions are designated with the same reference characters, in some cases with the addition of small letters.

Features which are only described in regard to one exemplary embodiment can be provided in the context of the invention also in the case of any other exemplary embodiment of the invention. Modified exemplary embodiments of this kind are also comprised by the invention, even if they are not depicted in the drawings.

All disclosed features are in themselves fundamental to the invention. Also included fully in terms of content in the disclosure of the application hereby are the disclosure content of the associated priority documents (copy of the earlier application) as well as of the printed publications cited and of the described devices of the prior art, also for the purpose of including individual or several features of these documents in one or in several claims of the present application.

BRIEF DESCRIPTION OF THE DRAWING

There is shown.

DETAILED DESCRIPTION OF THE INVENTION

Figure 1:
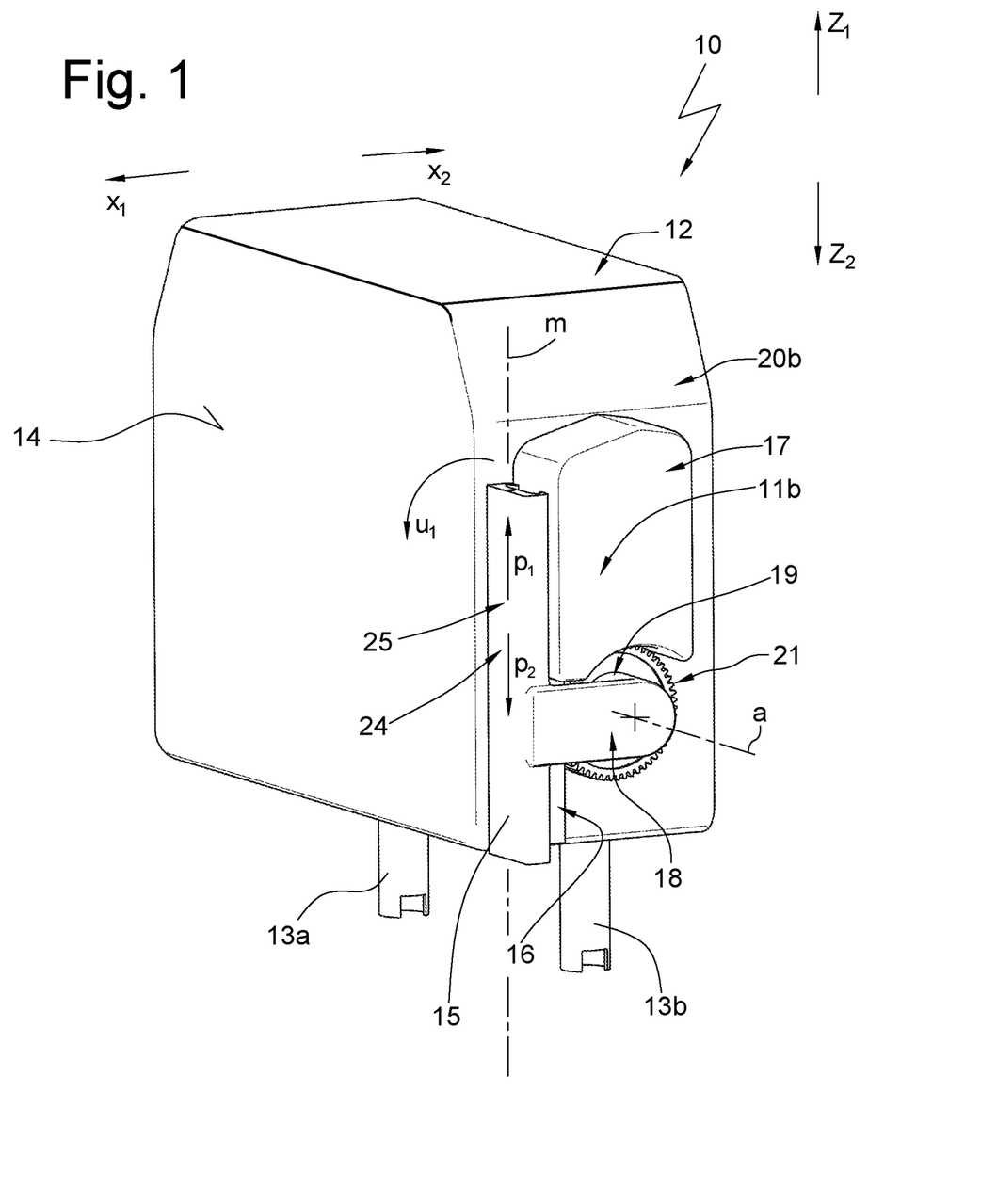
FIG. 1 a depiction in perspective of an equipment part in the form of a headrest with a head contact part with a pivot device in the form of an audio wing, which is arranged in the first position, which is a non-use position, FIG. 2 a depiction according to FIG. 1, wherein the pivot device is arranged in the second position, which is a use position, FIG. 3 a rear view in perspective of the head contact part, wherein a rear cover is not depicted for reasons of clarity, FIG. 4 a side view of the headrest according to FIG. 1, FIG. 5 a side view according to FIG. 4, wherein the pivot device is arranged in an intermediate position, FIG. 6 a side view according to FIG. 4, wherein the pivot device is arranged in the second position, FIG. 7 a sectional view according to section line B-B in FIG. 3, FIG. 8 a sectional view, wherein the pivot device is located in an intermediate position, FIG. 9 a sectional view following FIG. 7, wherein the pivot device is located in the second position.

In FIG. 1 an equipment part 10 in the form of a headrest is depicted. A base 12 of the headrest is supported on holding rods 13a and 13b, which can be attached to the backrest of a vehicle seat, which is not depicted. A head contact surface 14 is formed on the base 12.

Figure 3:
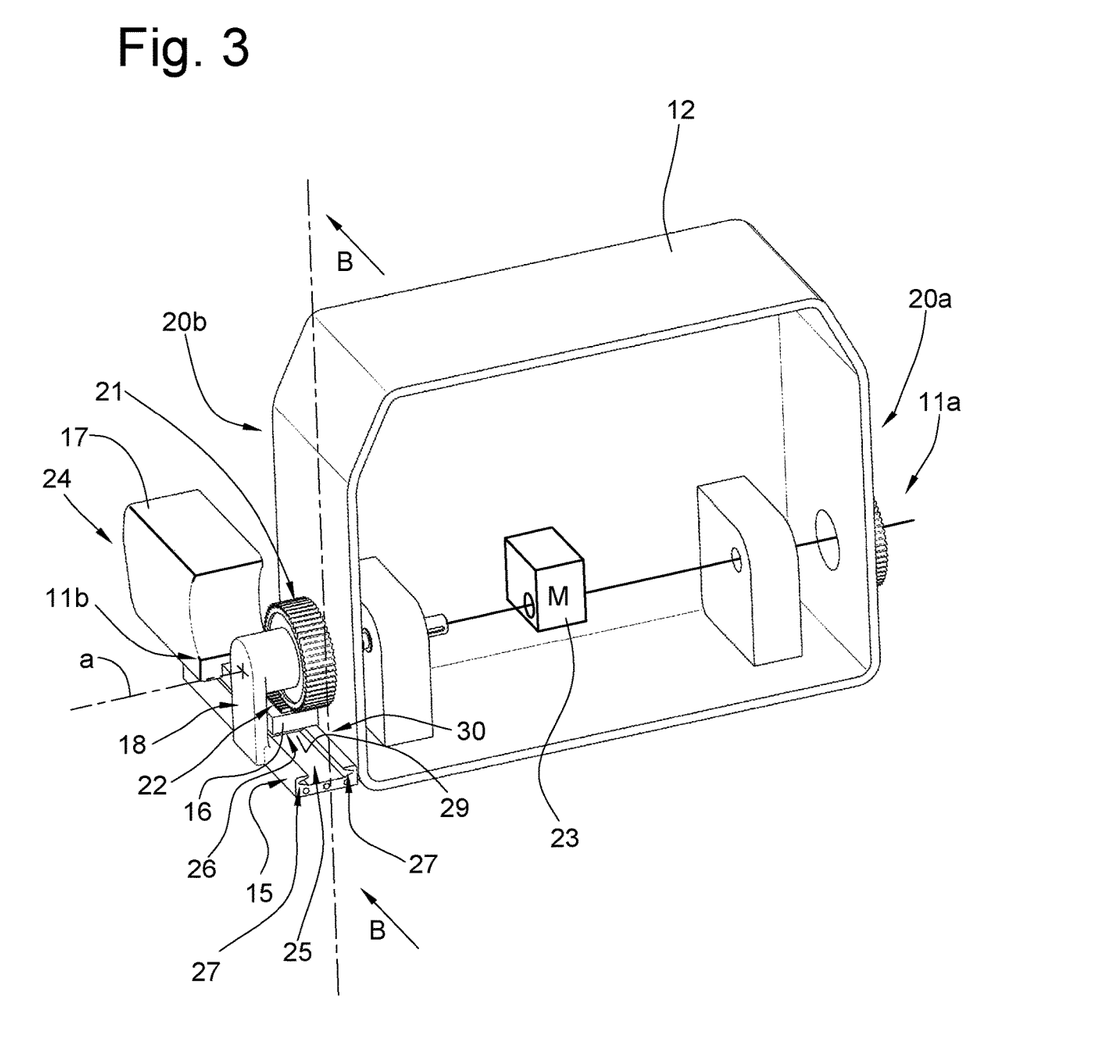

In the present exemplary embodiment, the equipment part 10 is provided with pivot devices 11a and 11b, which are formed on opposing side regions 20a and 20b. In FIG. 1, only one pivot device 11b is recognizable. The pivot device 11a is only indicated in FIG. 3. The pivot device 11a nevertheless corresponds to the pivot device 11b substantially described here.

Figure 2:
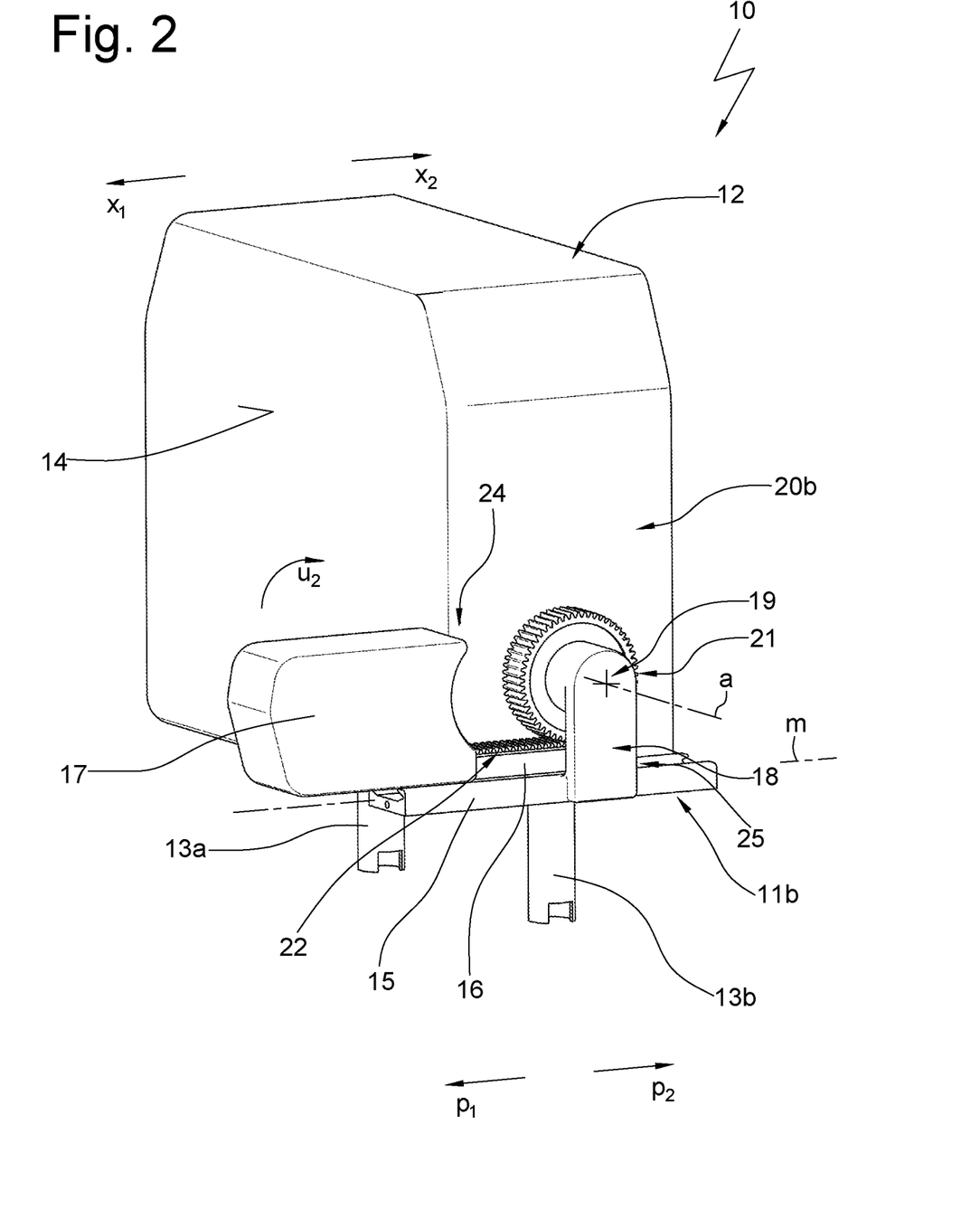

The pivot devices 11a and 11b comprise an arm 24, which is supported pivotably about a pivot axis a on the base part 12 of the equipment part 10. The arm 24 is pivotable between a first position depicted in FIG. 1 and a second position depicted in FIG. 2. The pivot angle is e.g. approximately 90°.

The pivot device 11 has audio components, such as e.g. loudspeaker and/or microphone, which are to be moved for an advantageous sound and if applicable an advantageous recording of speech into a position that lies with reference to a direction x1 before the head contact surface 14 of the base part 12. In addition, synchronously with the pivoting movement, a translatory relative movement of the extension part 16 takes place relative to the base part 15 such that the extension part 16 and the base part 15 are located in the first position in a nested arrangement and in the second position in an elongated arrangement.

In the elongated arrangement, the arm 24 has a length L2. In the nested arrangement, the arm has a shorter length L1 with reference to the elongated arrangement. If the audio functions are not required, the freedom of movement and the view of the seat occupant should not be adversely affected.

The arm 24 comprises a base part 15 and an extension part 16 that is movable in a translatory manner relative to the base part 15 in the directions p1 and p2. Held on the extension part 16 is a carrier 17, which comprises the audio components in a manner is that is not depicted.

A guide device 30 has first guide means 25 of the base part 15 and second guide means 26 of the extension part 16. The first guide means 25 interact with the second guide means 26 of the extension part 16 such that the extension part 16 is movable in the directions p1 and p2. The directions p1 and p2 refer to a movement of the extension part 16 relative to the base part 15.

The guide means 25 and 26 are e.g. designed such that freedom of movement of the extension part 16 relative to the base art 15 only exists in the directions p1 and p2. In the present case, this is a so-called dovetail guide, wherein lateral regions of the guide means 26 are guided in grooves 27 of a guide track of the guide means 25.

The base part 15 is held on a bracket 18, which is attached to a rotary shaft 19. The rotary shaft 19 can be driven by a drive shaft 28 of a motor 23 (see FIG. 3), which is held on the base part 12. The motor 23 can drive the rotary shaft 19—as in the present exemplary embodiment—e.g. in two different directions of rotation u1 and u2. Alternatively, the direction of rotation can be reversed by means of a transmission interconnected between the bracket 18 and the rotary shaft 19. The motor 23 can also have a transmission to change its initial speed.

On both side regions 20a and 20b of the base 12, a first support surface 21 in the form of teeth of a gearwheel in each case is connected immovably to the base 12. The teeth of the first support surface 21 mesh with teeth of a toothed rail, which is formed by the second support surface 22. The second support surface 22 is fixedly connected to the extension part 16 or formed integrally with this.

Figure 4:
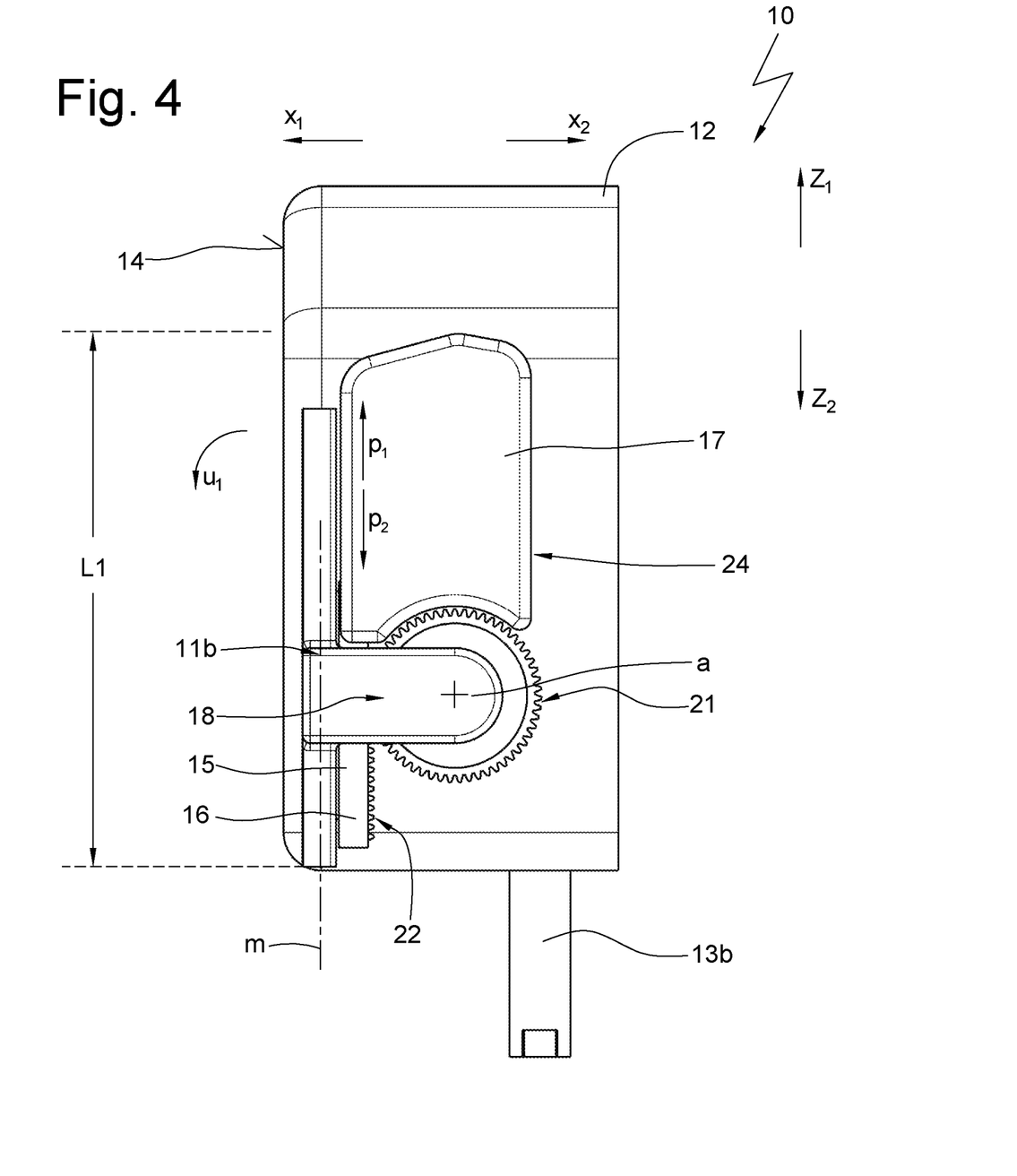
Figure 7:
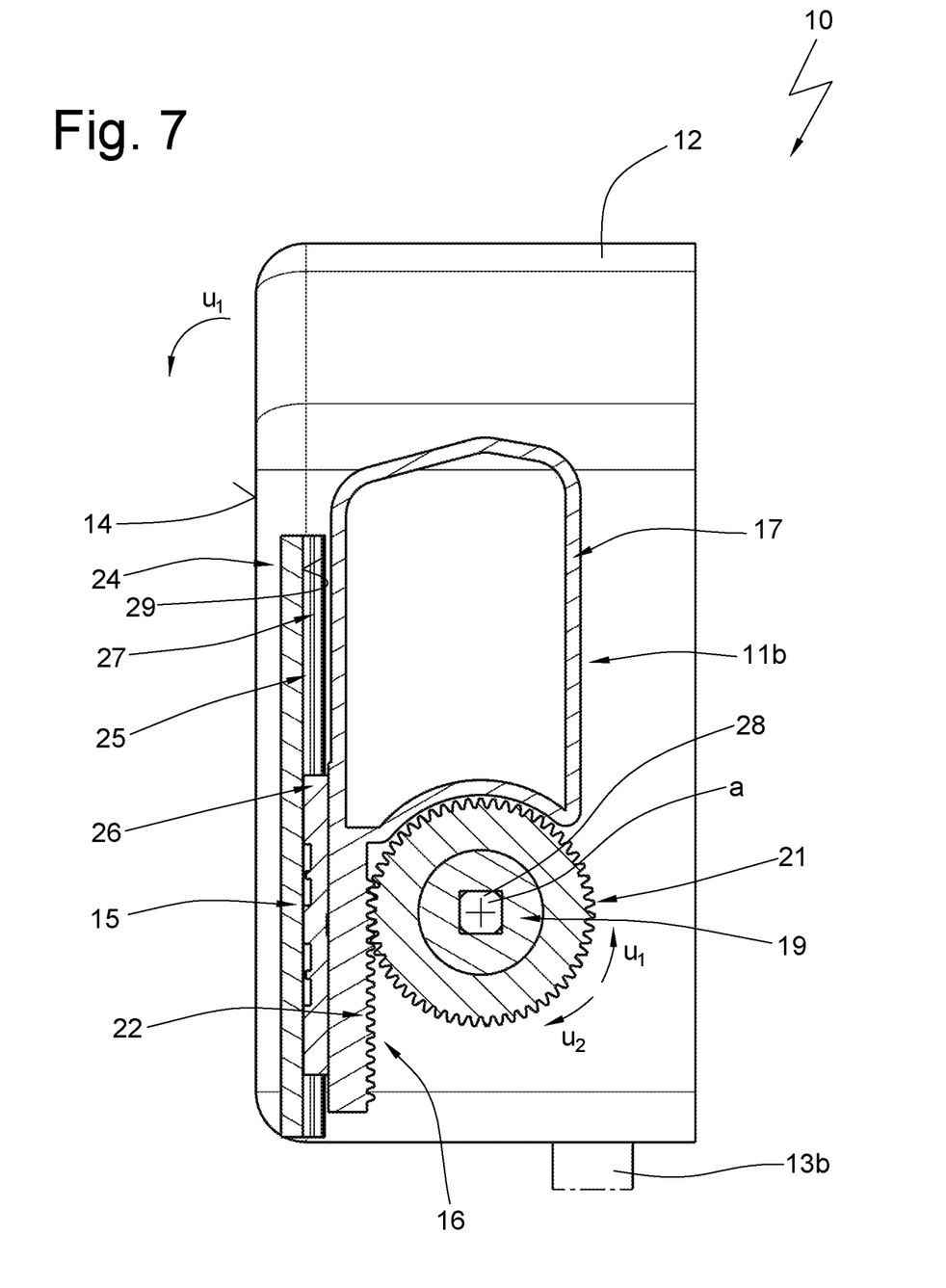

A movement of the arm 24 about the rotary axis a from the first position according to FIGS. 4 and 7 in the direction u1 causes a movement of the extension part 16 relative to the base part 15 in the direction p1. In the first position, the arm 24 has a length L1.

When the arm 24 has reached the second position (see FIGS. 6 and 9), the extension part 16 is maximally extended and has the length L2.

In the present exemplary embodiment, the first position is a vertical position, i.e. a center line m of the base part 15 is arranged approximately vertically. The term "vertical" in the sense of the invention includes the vertical and deviations of the position of the base part of up to 20° from the vertical in both directions of rotation. The first position in the present example is a non-use position.

In the second position, the base part 15 is pivoted by approximately 90 with regard to the first position. The second position is a horizontal position in the present example, i.e. the center line m of the base part 15 is arranged approximately horizontally. The term "horizontal" in the sense of the invention includes the horizontal and deviations of the position of the base part of up to 20 from the horizontal in both directions of rotation. The second position in the present example is a use position.

The arm 24 is driven by means of the motor 23 in the reverse direction of rotation in order to rotate it in direction u2 from the second position to the first position. During this movement, the extension part 16 is moved in direction p2 relative to the base part 15.

It is recognizable in FIGS. 6 to 9 that in all positions of the base part 15, the second support surface 22 of the extension part 16 is arranged between a guide surface 29 of the base part 15 and the first support surface 21 such that the first support surface 21 and the second support surface 22 are always in engagement. Since the first support surface 21 and the second support surface 22 in this exemplary embodiment comprise interacting teeth, e.g. a clearance fit is adequate. In the case that instead of teeth, the first support surface 21 and the second support surface 22 alternatively have friction surfaces, e.g. an oversize fit should be chosen.

Figure 5:
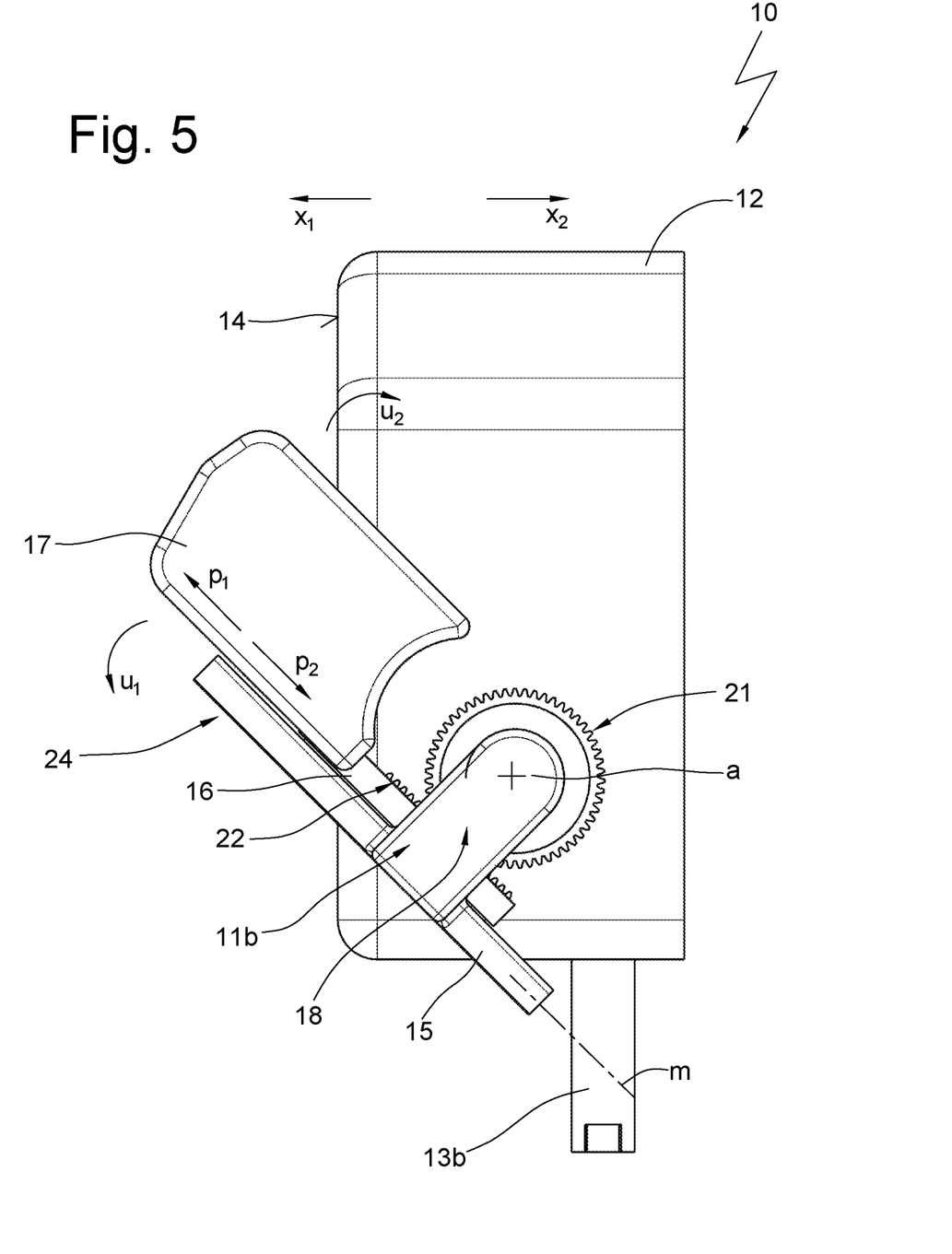
Figure 6:
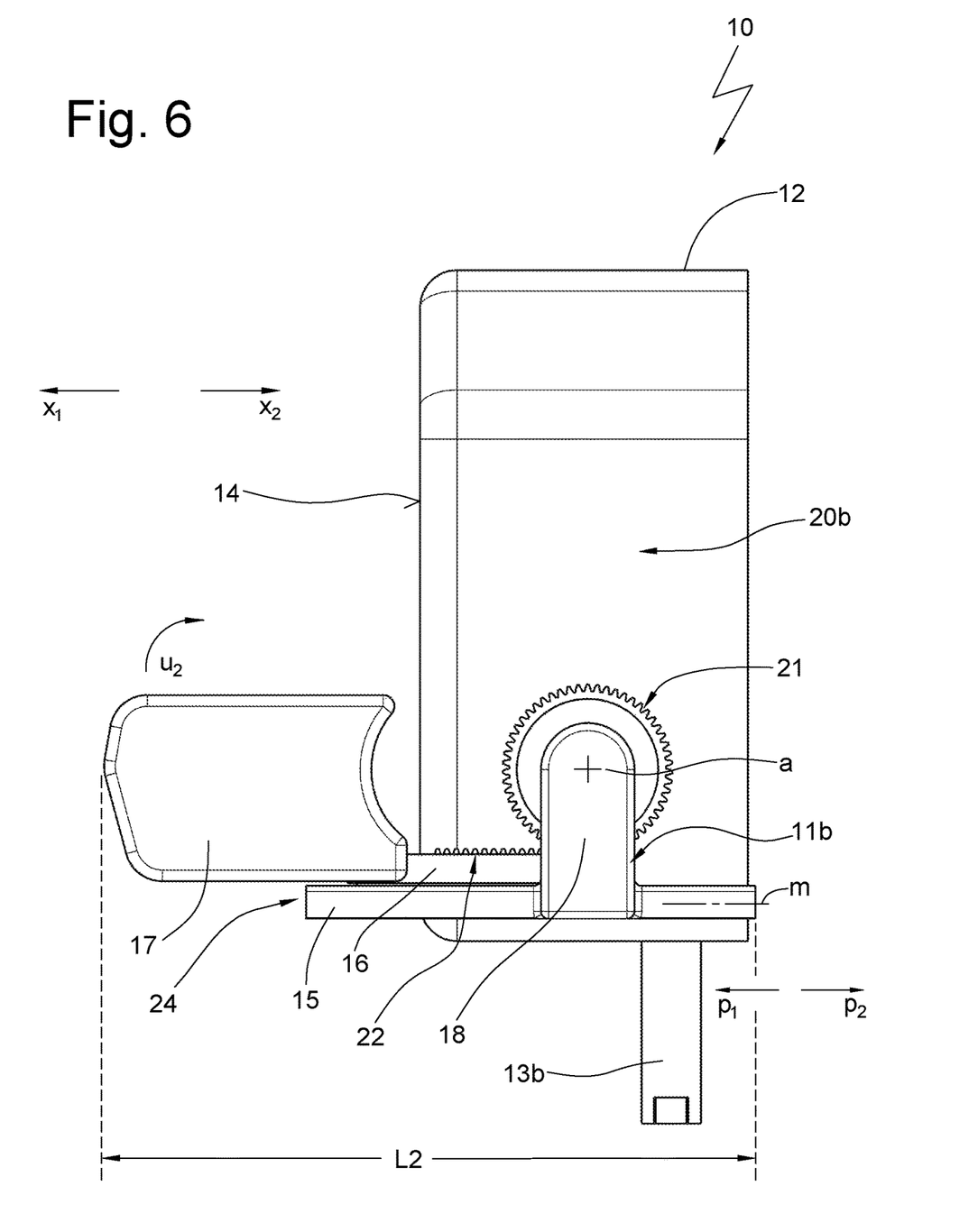
Figure 8:
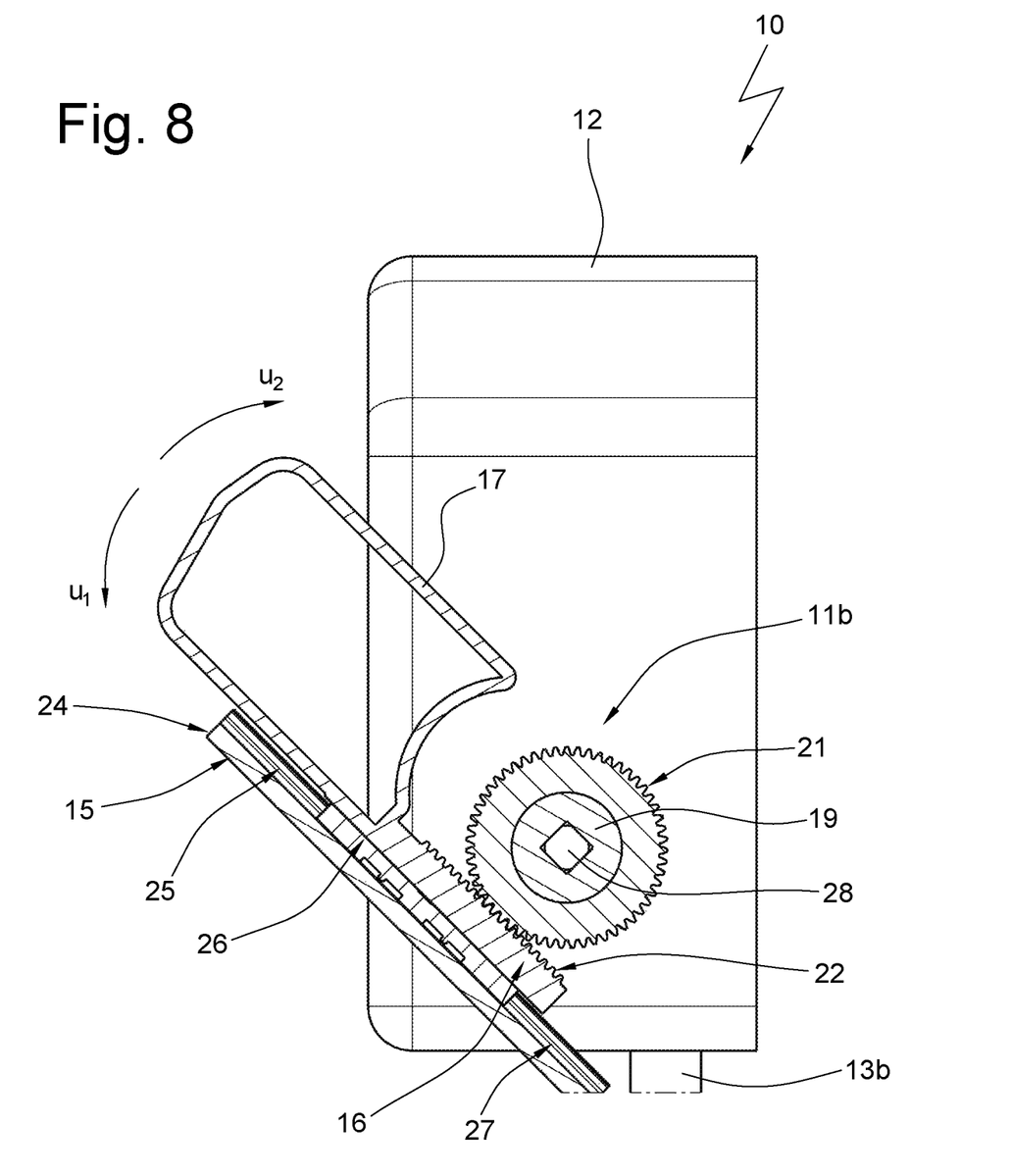
Figure 9:
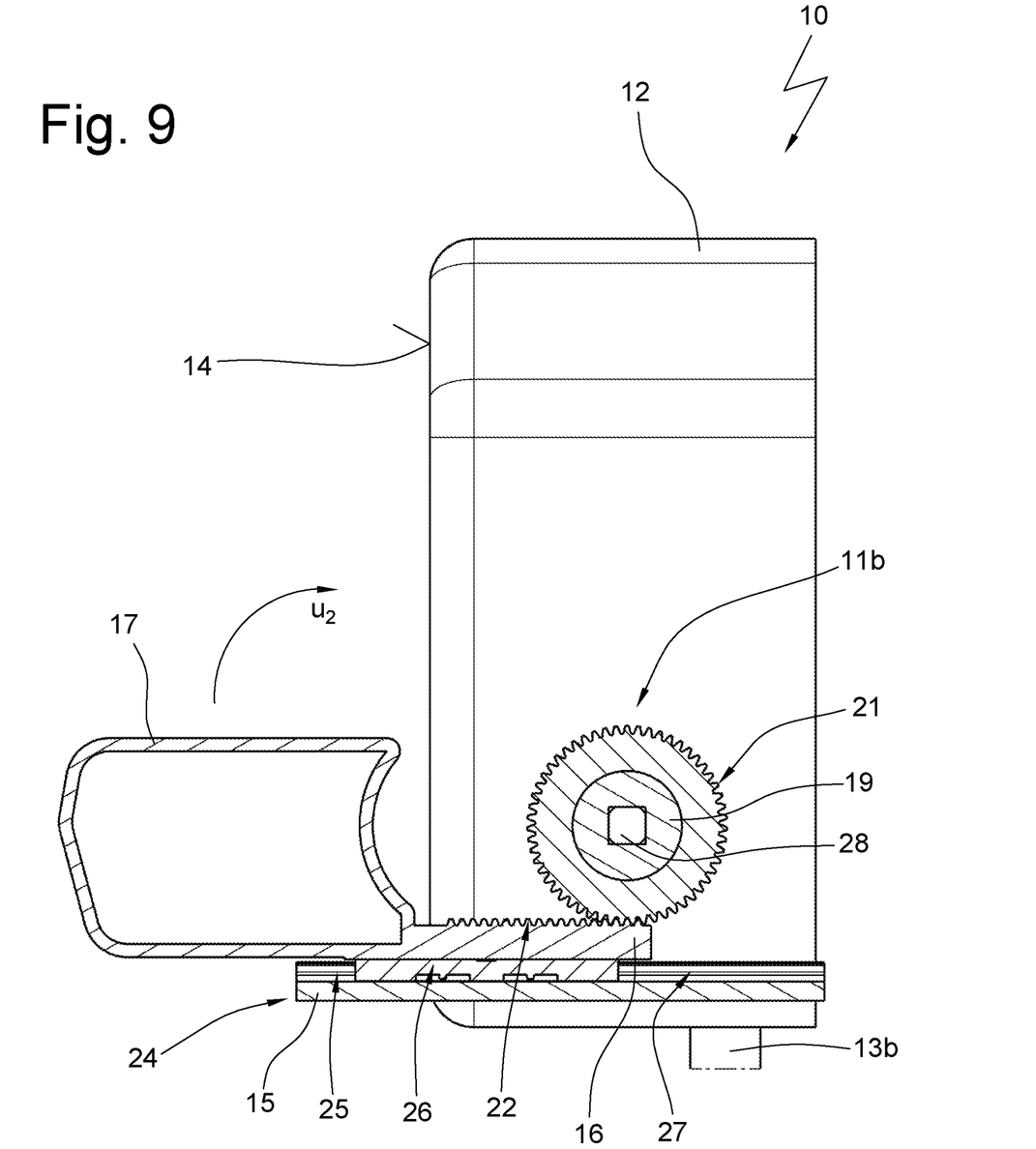

In FIGS. 7 to 9, the positions of FIGS. 4 to 6 are shown, wherein the pivot device 20b is depicted in section. The drive shaft 28 and the rotary shaft 19 are recognizable.

Alternatively to the exemplary embodiment described here, the equipment part 10 could also have just one pivot device with one arm 24 comprising a base part 15 and an extension part 16.

The invention claimed is:

1. An equipment part for a vehicle, comprising: a base; at least one pivot device that comprises an arm that is pivotable relative to the base about a pivot axis; and a drive device that pivots the arm between a first position and a second position, wherein the arm includes a base part and an extension part, wherein the extension part is guided movably in a translatory manner relative to the base part between a primary position and a secondary position, associated with the base is a first support surface that engages with a second support surface that is associated with the extension part, and rolls on the second support surface during pivoting movement between the first position and the second position, wherein the extension part moves between the primary and the secondary position, wherein the second support surface is formed by a toothed rail and the first support surface is formed by a gearwheel.

2. The equipment part according to claim 1, wherein the first support surface is fixedly connected to the base.

3. The equipment part according to claim 1, wherein the first support surface is driven rotatably relative to the base.

4. The equipment part according to claim 1, wherein the second support surface is fixedly connected to the extension part.

5. The equipment part according to claim 1, wherein the first support surface is formed by a friction wheel and the second support surface is formed by a friction track.

6. An equipment part for a vehicle, comprising: a base; at least one pivot device that comprises an arm that is pivotable relative to the base about a pivot axis; and a drive device that pivots the arm between a first position and a second position, wherein the arm includes a base part and an extension part, wherein the extension part is guided movably in a translatory manner relative to the base part between a primary position and a secondary position, associated with the base is a first support surface that engages with a second support surface that is associated with the extension part, and rolls on the second support surface during pivoting movement between the first position and the second position, wherein the extension part moves between the primary and the secondary position, wherein the base part has first guide means that engage with second guide means of the extension part, wherein the first guide means has side regions that are guided in grooves of the second guide means.

7. The equipment part according to claim 1, comprising a guide device configured so that a movement in opposite directions of a movement path is possible and a movement in other movement directions is prevented.

8. The equipment part according to claim 6, wherein the second support surface of the extension part is arranged between a guide surface of the second guide means and the first support surface so that the first support surface and the second support surface are in contact.

9. The equipment part according to claim 1, wherein the drive device comprises at least one electric motor.

10. The equipment part according to claim 1, wherein the equipment part is a headrest and the pivot device is an arm that is pivotable relative to the base.

11. The equipment part according to claim 1, wherein the equipment part is an arm and the pivot device is an armrest that is pivotable relative to the base.

* * * * *